United States Patent
Putnam

[19]

[11] Patent Number: 6,129,486
[45] Date of Patent: Oct. 10, 2000

[54] PIPE PULLING AND PUSHING APPARATUS AND METHOD

[76] Inventor: Samuel W. Putnam, 305 Darbonne Dr., West Monroe, La. 71291

[21] Appl. No.: 09/126,038

[22] Filed: Jul. 29, 1998

[51] Int. Cl.[7] ................................................ F16L 1/028
[52] U.S. Cl. ...................... 405/184; 405/154; 254/29 R
[58] Field of Search .................................. 405/184, 179, 405/154; 254/29 R, 30, 31

[56] References Cited

U.S. PATENT DOCUMENTS

| | | | |
|---|---|---|---|
| 2,044,483 | 6/1936 | Neher | 254/29 R |
| 2,126,933 | 8/1938 | Stone et al. | 254/29 R |
| 2,889,135 | 6/1959 | Tennyck | 254/29 |
| 2,939,739 | 6/1960 | Grunsky | 294/96 |
| 3,094,312 | 6/1963 | Woolgar | 254/29 |
| 3,787,950 | 1/1974 | Bagby | 29/237 |
| 3,834,668 | 9/1974 | Casey | 254/29 R |
| 3,998,428 | 12/1976 | Miles | 254/29 R |
| 4,030,183 | 6/1977 | Smola | 29/252 |
| 4,571,802 | 2/1986 | Calhoun | 29/157.3 |
| 5,112,070 | 5/1992 | Hahn | 280/79.4 |
| 5,208,967 | 5/1993 | Beard | 254/29 R |

*Primary Examiner*—Eileen Dunn Lillis
*Assistant Examiner*—Frederick L. Lagman
*Attorney, Agent, or Firm*—John M Harrison

[57] ABSTRACT

A pipe pulling and pushing apparatus and method of operation, which apparatus includes a spring-loaded wedge device seated in a driving apparatus and fitted to a rod or pipe for forcing the rod or pipe beneath a road, pipeline or other barrier where trenching is not feasible. The spring-loaded wedge is characterized by a housing which receives a coil spring positioned to intermittently engage a wedge defined by wedge segments collectively having a rod bore and teeth for selectively gripping the rod or pipe when the spring is fully extended, and releasing the rod or pipe when the spring is compressed. Repetitive gripping and releasing of the rod or pipe by the wedge is effected responsive to operation of the driving apparatus to incrementally drive the rod or pipe through the terrain beneath the barrier. The spring-loaded wedge can also be positioned on the rod or pipe in the driving apparatus to pull the rod or pipe through the terrain beneath the barrier.

25 Claims, 4 Drawing Sheets

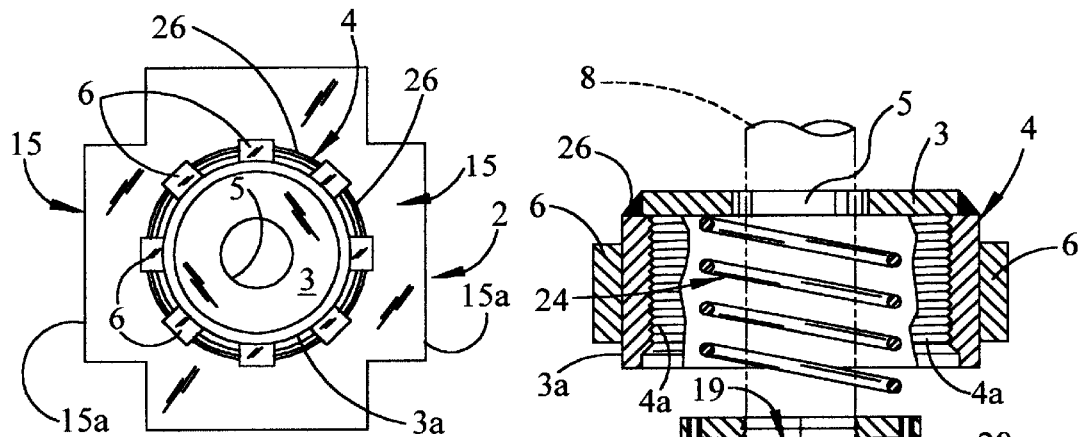
FIG. 7
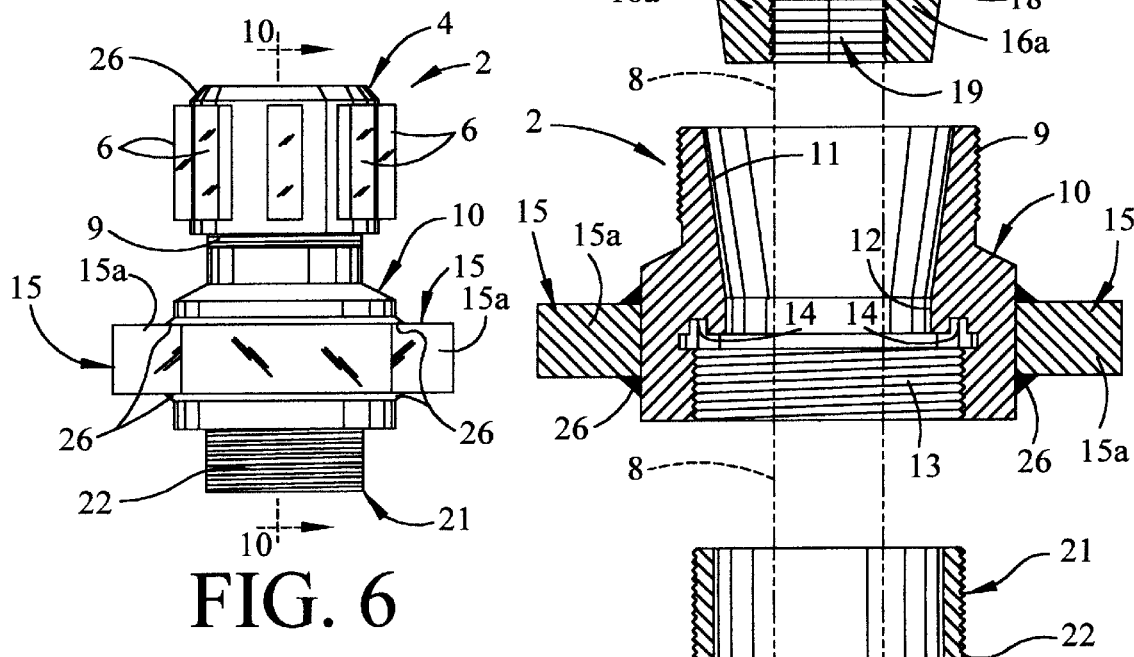
FIG. 6
FIG. 9
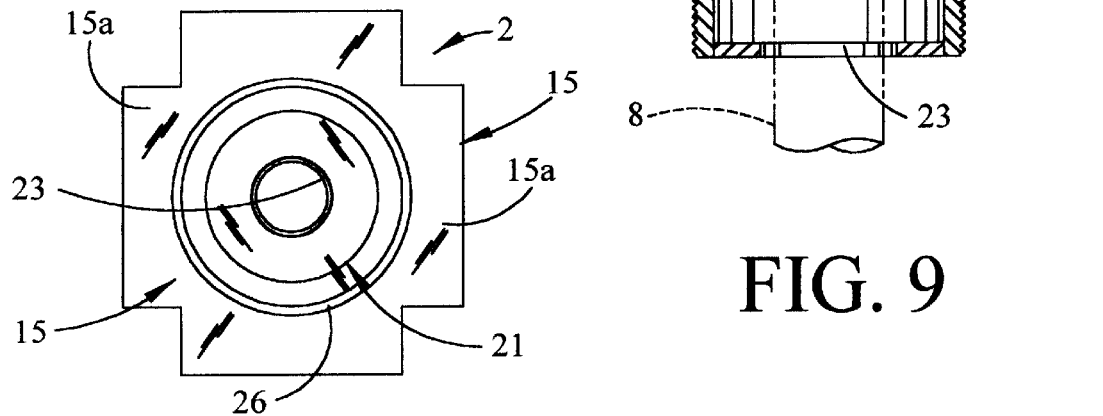
FIG. 8

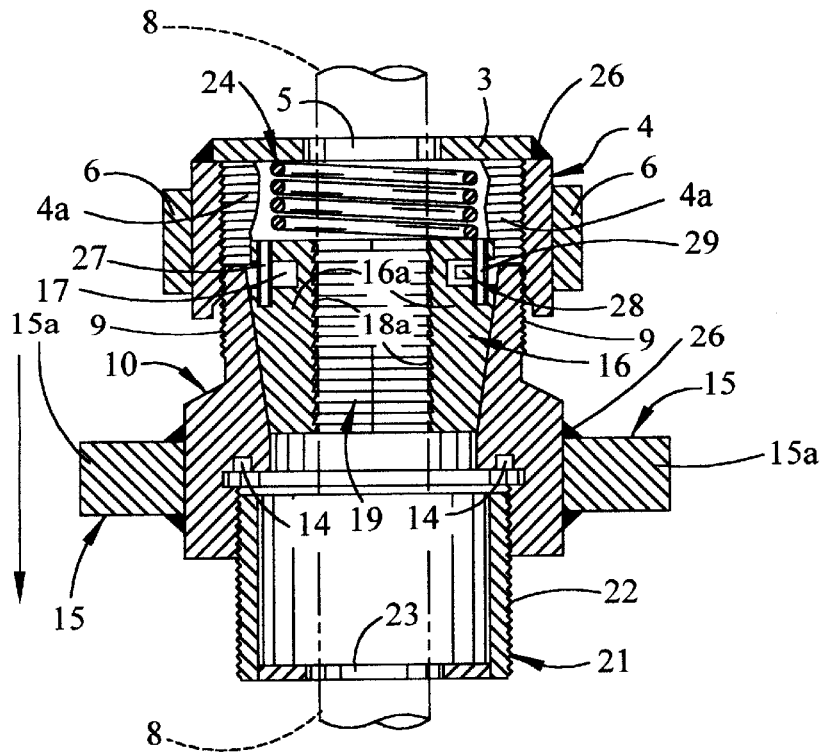
FIG. 10
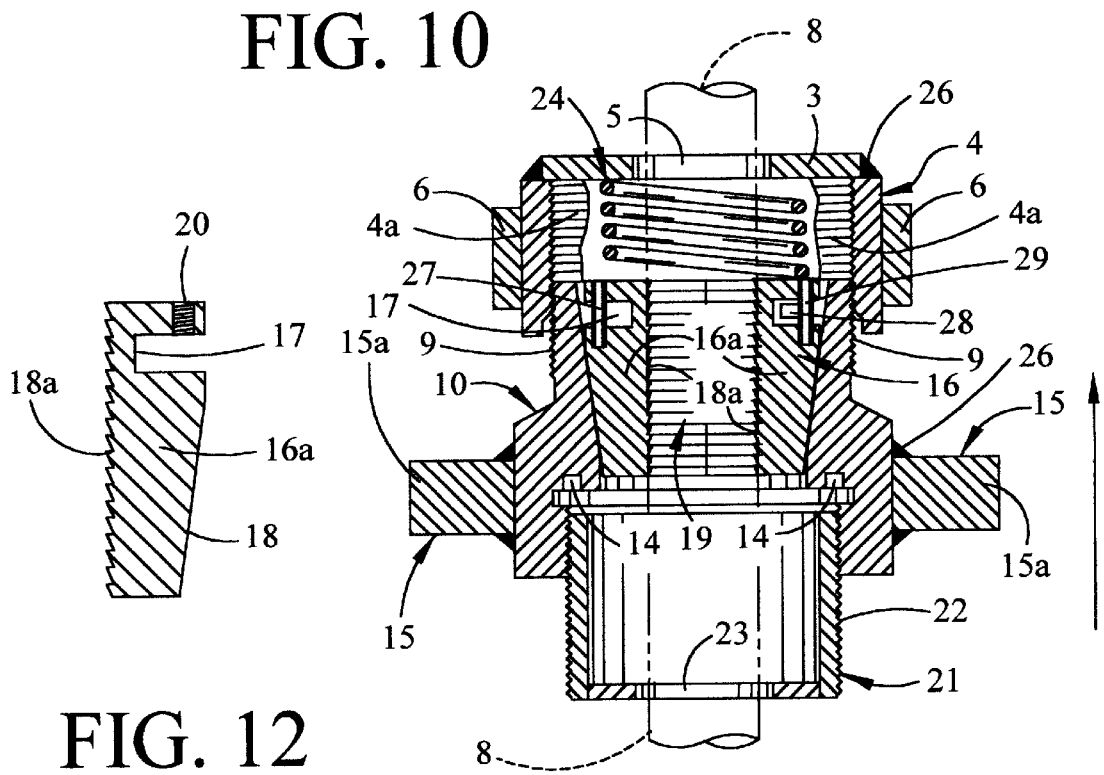
FIG. 12
FIG. 11

PIPE PULLING AND PUSHING APPARATUS AND METHOD

BACKGROUND OF THE INVENTION

FIELD OF THE INVENTION

This invention relates to extension of pipe beneath a barrier such as a road, railroad, track, pipeline or the like when trenching is not feasible and more particularly, to a pipe pulling and pushing apparatus and method of operation. In a preferred embodiment the pipe pulling and pushing apparatus includes a spring-loaded wedge having a housing fitted with an internal coil spring intermittently engaging sliding, articulating wedge segments collectively provided with a bore for receiving the rod or pipe to be deployed and having teeth for selectively engaging and releasing the rod or pipe responsive to operation of a driving apparatus which receives the spring-loaded wedge. The driving apparatus is typically hydraulically operated to incrementally advance the rod or pipe with the spring-loaded wedge through the terrain beneath the barrier responsive to engagement and release of the wedge segments with the rod or pipe inside the spring-loaded wedge housing.

One of the problems realized in the laying of pipelines and piping of relatively small diameter is that of access under barriers such as highways, railroad tracks, existing pipelines and the like, where trenching is not feasible or practical. Various apparatus have been designed to effect extension of pipe or rods through such terrain beneath these barriers. Typical of these devices is the "Pipe Puller" detailed in U.S. Pat. No. 2,939,739, dated Jun. 7, 1960, to Grunsky. The Grunsky pipe puller is designed to engage the interior surface of a pipe and exert a pulling force on the pipe to pull the engaged pipe in the direction of the applied force. U.S. Pat. No. 3,787,950, dated Jan. 29, 1974, to Bagby, details an "Apparatus For Reclaiming Collet Hose Fittings". Collet-type hose fittings have malleable fingers radially clasped to secure the skived end of a hydraulic hose telescoped on its stem for securing to a mandrel having a coaxial plunger. U.S. Pat. No. 4,030,183, dated Jun. 21, 1977, to R. L. Smola, details a "Tool Assembly For Mounting And Removing Overhung Rolls. The tool assembly is used for mounting and removing work rolls on the end sections of roll shafts and is hydraulically actuated, with a piston removably attached to the roll shaft of the work roll and a cylinder. Operation of the piston within the cylinder mounts or removes the work roll. U.S. Pat. No. 5,112,070, dated May 12, 1992, to Kevin C. Hahn, details a "Dual Wheel Puller/Dolly". The pulley/dolly operates by an internal coil spring to facilitate removal of a wheel bearing from a wheel hub. U.S. Pat. No. 4,571,802, dated Feb. 25, 1986, to G. L. Calhoun, et al, details a "Double Grip, Relative Motion Tube Puller". The tube puller includes upper and lower gripping mechanisms for gripping the section of a tube surrounded by a tube sheet. The two gripping mechanisms are mechanically linked by an extendible connecting assembly which includes an outer sleeve where the lower gripping apparatus is located, and amid the sleeve where the upper gripping apparatus is positioned. The gripping apparatus coact to withdraw a tube from a tube sheet. U.S. Pat. No. 3,094,312, dated Jun. 18, 1963, to R. J. Woolgar, details a "Power Assisted Feed For A Kelly Bar". The apparatus includes a rotatable member having a central opening for the axial passage of a generally vertical kelly bar, at least two gripping members associated with a rotatable member and symmetrically disposed about the central opening and adapted to cooperate in releasably gripping the sides of the kelly bar. Further included is a thrust device for applying axial thrust to the rotatable member, such that downward thrust can be transmitted to the kelly bar. U.S. Pat. No. 2,889,135, dated Jun. 2, 1959, to W. Tennyck, details a "Pipe Pushing Machine". The machine includes a base frame work which mounts a reciprocating carriage having pipe clamping jaws. An operating component is connected to the carriage for reciprocating the carriage with respect to the base frame and manipulation of the operating component when a rod positioned in the lugs forces the rod through the ground.

It is an object of this invention to provide a new and improved rod and pipe pulling and pushing apparatus for pulling or pushing a rod or pipe through the terrain beneath a barrier.

Another object of the invention is to provide a new and improved rod or pipe pulling and pushing apparatus which is characterized by a spring-loaded wedge device that may be positioned in a driving apparatus to sequentially and incrementally pull or push the rod or pipe through the terrain beneath a barrier responsive to operation of the driving apparatus.

Still another object of the invention is to provide a rod or pipe pulling and pushing apparatus, a first element of which includes a spring-loaded wedge having a housing and a movable wedge defined by articulating wedge segments intermittently engaging a coil spring in the housing. A pipe or rod to be forced through the terrain beneath a barrier is extended through the wedge and the spring after the spring-loaded wedge is positioned in a driving apparatus, such that the rod or pipe may be incrementally and sequentially pulled or pushed through the terrain beneath the barrier by intermittent engagement and release of the rod or pipe by the wedge responsive to sliding movement of the wedge segments in the housing and operation of the driving apparatus.

Another object of the invention is to provide a spring-loaded wedge for use with a driving apparatus and a method for using the spring-loaded wedge for incrementally pushing or pulling a rod or pipe through the terrain beneath a barrier, which method includes the steps of positioning the spring-loaded wedge device for receiving the rod or pipe, placing the spring-loaded wedge device in the driving apparatus and operating the driving apparatus to successively engage and release internal, sliding wedge segments with the rod or pipe responsive to operation of the driving apparatus.

SUMMARY OF THE INVENTION

These and other objects of the invention are provided in a new and improved pipe pulling and pushing apparatus and method of operation, which apparatus includes a spring-loaded wedge device having a housing fitted with a tapered seat that slidably receives a wedge defined by articulating wedge segments collectively having a bore for receiving the rod or pipe and bore teeth for selectively engaging the rod or pipe, which wedge also intermittently engages a coil spring encircling the pipe. The spring-loaded wedge apparatus is positioned in a driving apparatus, which may be typically hydraulically operated, and operates to incrementally and sequentially advance the spring-loaded wedge and force the rod or pipe through the ground beneath a barrier. Intermittent release of pressure on the spring-loaded wedge by the driving apparatus allows the coil spring to reseat the internal wedge segments on the rod or pipe for successive, incremental movement of the rod or pipe through the ground.

BRIEF DESCRIPTION OF THE DRAWINGS

The invention will be better understood by reference to the accompanying drawings wherein:

FIG. 6 is a top view of the spring-loaded wedge in assembled configuration for mounting in a driving apparatus;

FIG. 7 is a front view of the spring-loaded wedge illustrated in FIG. 6;

FIG. 8 is a rear view of the spring-loaded wedge illustrated in FIGS. 6 and 7;

FIG. 9 is an exploded sectional view of the spring-loaded wedge illustrated in FIGS. 6–8;

FIG. 10 is a sectional view taken along line 10—10 in FIG. 6, more particularly illustrating the internal spring-operated wedge in release configuration with the spring compressed to facilitate return of the wedge elements to the rod or pipe-engaging position within the spring-loaded wedge;

FIG. 11 is a sectional view also taken along line 10—10 of the spring-loaded wedge illustrated in FIG. 6, more particularly illustrating engagement of the internal wedge elements with the rod or pipe and the internal spring in relaxed configuration responsive to operation of the driving apparatus to pull or push the rod or pipe through the ground;

FIG. 12 is a sectional view of a typical wedge segment of the wedge illustrated in FIGS. 9–11;

DESCRIPTION OF THE PREFERRED EMBODIMENTS

Figure 1:
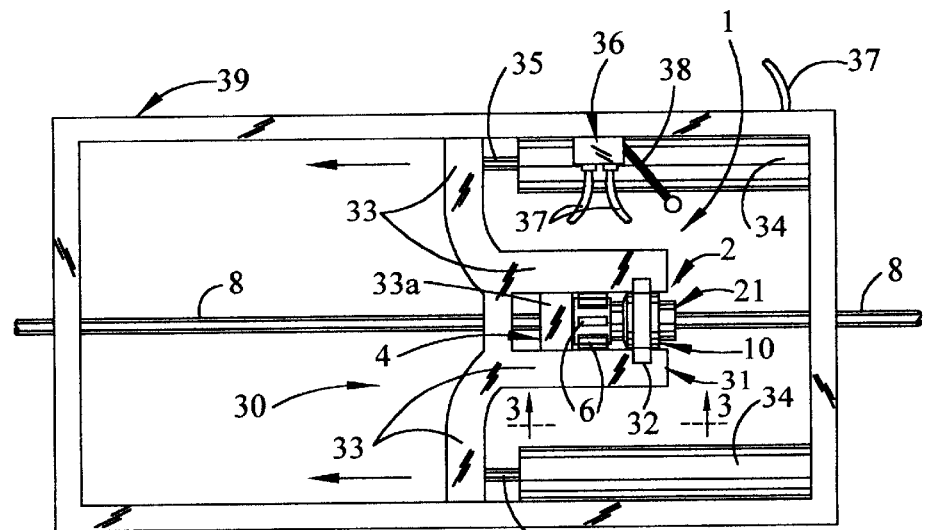
FIG. 1 is a top view of a preferred embodiment of the pipe pulling and pushing apparatus, including a spring-loaded wedge and driving apparatus, with the driving apparatus pistons positioned in extended configuration.
Figure 3:
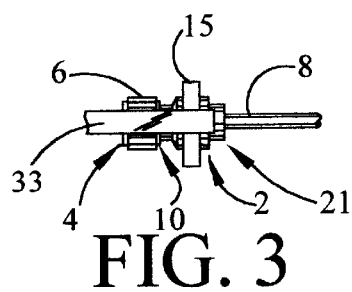
FIG. 3 is a side view of the spring-loaded wedge seated in one of a pair of carriage arm of the driving apparatus illustrated in FIGS. 1 and 2.
Figures 4, 5:
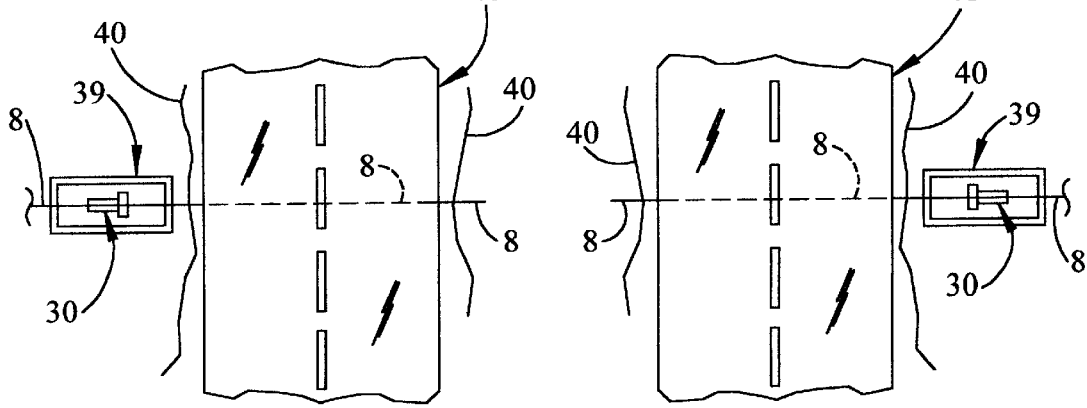
FIG. 4 is a schematic diagram illustrating the spring-loaded wedge and driving apparatus in pushing configuration.
FIG. 5 is a schematic view illustrating the spring-loaded wedge and driving apparatus in pulling configuration.

Referring initially to FIGS. 1–5 of the drawings, the pipe pulling and pushing apparatus of this invention is generally illustrated by reference numeral 1. The pipe pulling and pushing apparatus 1 is characterized by a spring-loaded wedge 2, typically mounted in a driving apparatus 30, with a rod or pipe 8 extending through the spring-loaded wedge 2 and from each end of the frame 39 of the driving apparatus 30, as illustrated in FIG. 1. It will be appreciated by those skilled in the art that the spring-loaded wedge 2 of this invention can be used with any properly designed driving apparatus 30, the driving apparatus 30 illustrated in the drawing being specifically designed to receive and mount the spring-loaded wedge 2 in pushing and/or pulling configuration, as hereinafter further described. Accordingly, as illustrated in FIGS. 4 and 5 the rod driving apparatus 30 and the mounted spring-loaded wedge 2 can be positioned as illustrated in FIG. 4 to push the rod or pipe 8 through the ground or terrain 40 beneath a barrier such as a road 41, while in FIG. 5 the rod or pipe 8 may be alternatively pulled through the terrain 40.

Referring again to FIGS. 1 and 2 of the drawings, during a pushing or pulling operation, the rod or pipe 8 is extended through the terrain 40 beneath the barrier or road 41 by extending and retracting the cylinder pistons 35, mounted in parallel, double-action hydraulic cylinders 34 and connected to the carriage arms 33, respectively. Accordingly, the rod or pipe 8 can be pulled through the terrain 40 if the terrain 40 is located on the left-hand side of the frame 39 or pushed through the terrain 40 if the terrain 40 is located on the right-hand side of the frame 39, as hereinafter further described. This extension and retraction of the cylinder pistons 35 from and into the hydraulic cylinders 34 is effected by operation of a valve 36, controlled by manipulation of a control lever 38, which causes hydraulic fluid to flow from a tank (not illustrated) through the hoses 37 and the valve 36, to operate the hydraulic cylinders 34. The storage tank or vessel for the hydraulic fluid may be typically provided on a truck or other vehicle (not illustrated) as desired, for mobile operation of the pipe pulling and pushing apparatus 1.

Figure 14:
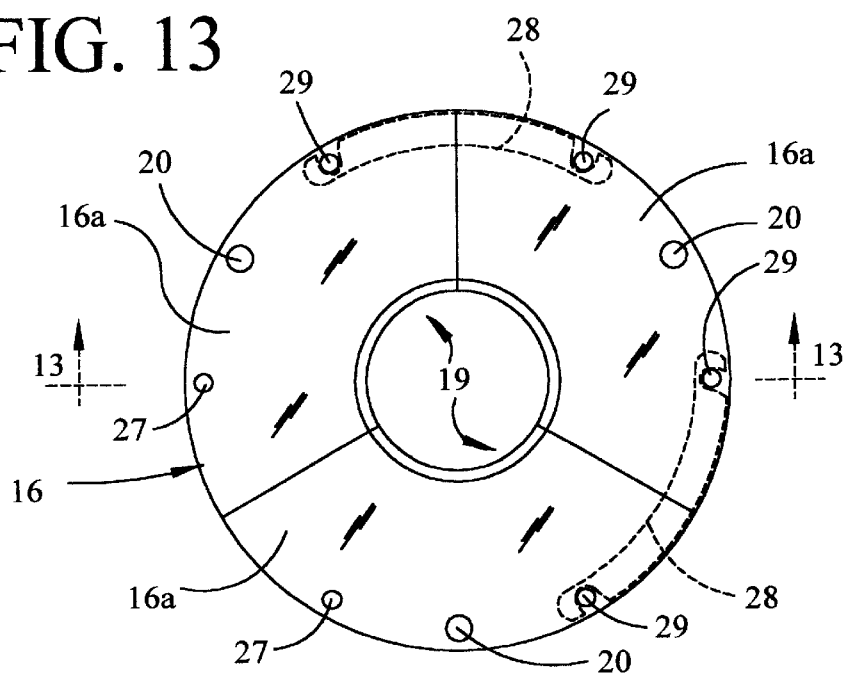
FIG. 14 is a top view of the wedge illustrated in FIGS. 9–11, more particularly illustrating a pivoting construction of the wedge segments.

Referring now to FIGS. 1, 6–9 and 14 of the drawings, the spring-loaded wedge 2 is designed to removably engage the rod driving apparatus 30 by means of a mount plate 15, having outwardly-extending mount plate flanges 15a for fitting in the carriage slot 32 of the carriage 31. The mount plate 15 is typically welded by means of welds 26 to a cylindrical adaptor body 10, having internal lower adaptor body threads 13 and external upper adaptor body threads 9. A taper bore 11 is provided in the upper end of the adaptor body 10 adjacent to a lower, non-tapered bore 12 and near the upper adaptor body threads 9 for receiving a wedge 16, which typically includes an articulating assembly of three wedge segments 16a, joined to define a wedge bore 19, as illustrated in FIG. 14. The wedge segments 16a each have wedge teeth 18a and a wedge taper 18 that matches the taper bore 11 in the adaptor body 10. The wedge bore 19 extends through the assembled, articulating wedge segments 16a to accommodate the rod or pipe 8, as further illustrated in phantom in FIG. 9. Circumferential retainer pin slots 17 are also provided in the top portion of the wedge segment 16a, for purposes which will be hereinafter further described.

As further illustrated in FIG. 9, a cylindrical male coupling seat 14 is inscribed in the interior of the adaptor body 10 adjacent to the lower adaptor body threads 13 to accommodate the top circular edge of a cylindrical male coupling 21, fitted with male coupling threads 22 and also having a male coupling rod opening 23 to accommodate the rod or pipe 8. Accordingly, the male coupling 21 defines the rear end of the spring-loaded wedge 2, as illustrated in FIG. 8. A pipe coupling 4 defines the front end of the spring-loaded wedge 2 and closes the adaptor body 10, as illustrated in FIG. 7. The pipe coupling 4 includes a cover plate 3, typically welded to the top end of a cylindrical collar 3a at a weld 26 and includes internal pipe coupling threads 4a in the collar 3a, as illustrated in FIG. 9. Multiple hammer flanges 6 are typically radially welded to the collar 3a for assembling and disassembling the pipe coupling 4 on the front or upper end of the adaptor body 10 as the internal pipe coupling threads 4a engage the external upper adaptor body threads 9 of the adaptor body 10. A cover plate rod opening 5 is provided in the cover plate 3 for accommodating the rod or pipe 8, as further illustrated in FIG. 9. A coil spring 24 is also provided in the pipe coupling 4 and encircles the rod or pipe 8, with one end of the coil spring 24 typically welded to the cover plate 3 and the opposite end intermittently engaging the top surface of the wedge 16 during operation of the pipe pulling and pushing apparatus 1, as hereinafter described. Accordingly, when the pipe coupling 4 and the male coupling 21 are threadably assembled on the adaptor body 10 the spring-loaded wedge 2 is configured as illustrated in FIGS. 6–8 of the drawings.

Figure 13:
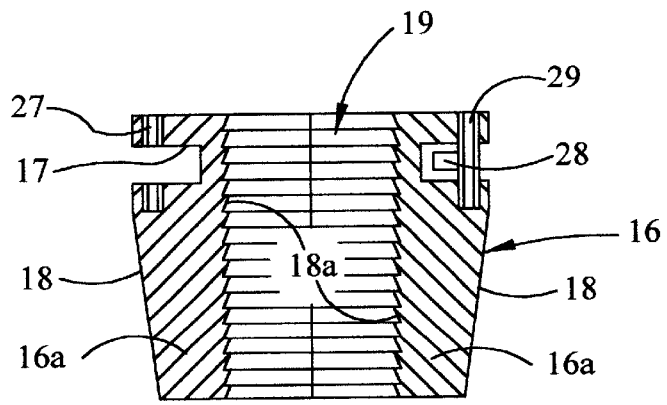
FIG. 13 is a sectional view taken along line 13—13 of a pair of wedge segments of the wedge illustrated in FIG. 14.
Figure 15:
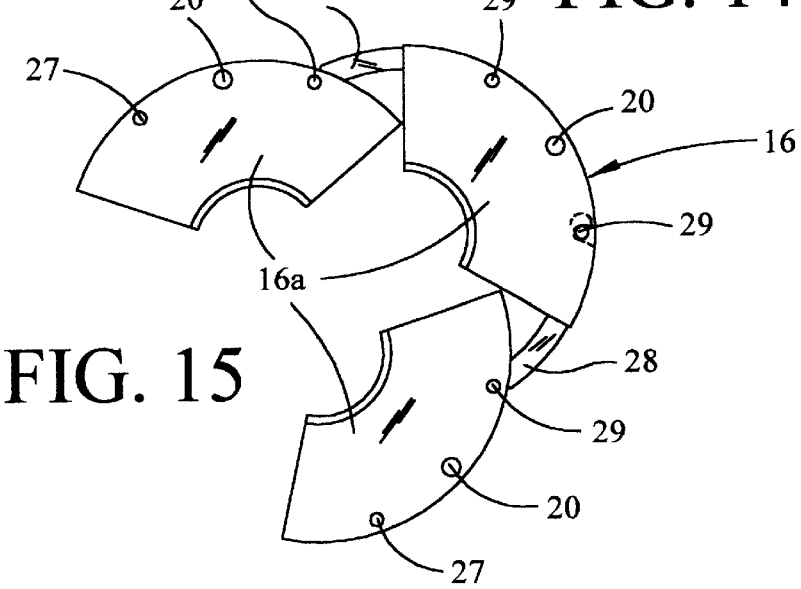
FIG. 15 is a top view of the wedge illustrated in FIG. 14, illustrating two of the wedge segments pivoted from the third wedge segment.

Referring now to FIGS. 12–15 of the drawings, in a preferred embodiment of the invention the wedge segments 16a are assembled in articulating, pivoting fashion to define the wedge 16 by means of a pair of retainer bars 28, illustrated in phantom in FIG. 14 and shown in FIG. 15, which slidably engage the circumferential retainer pin slots 17 provided in the respective wedge segments 16a. The retainer bars 28 are maintained in position in the curved retainer pin slots 17 by means of roll pins 29, inserted in roll pin seats 27, that extend through the retainer pin slots 17, as illustrated in FIG. 13. Threaded holes 20 are also provided in each of the wedge segments 16a as illustrated in FIGS. 12, 14 and 15, for accommodating threaded studs (not illustrated) and removing the wedge segments 16a from the adaptor body 10. Since only two retainer bars 28 are provided in adjacent areas of the respective wedge segments 16a, all three wedge segments 16a are maintained in the assembled configuration illustrated in FIG. 14 while the wedge 16 is mounted in the spring-loaded wedge 2 as heretofore described. However, under circumstances where it is desired to disassemble the wedge 16 for cleaning or replacement purposes, the wedge 16 can be first removed from the adaptor body 10 by threading the threaded studs (not illustrated) into the threaded holes 20 after the pipe coupling 4 is unthreaded from the upper adaptor body threads 9 of the adaptor body 10. Two of the wedge segments 16a can then be pivoted from the third wedge segment 16a on the corresponding roll pins 29 as illustrated in FIG. 15. Complete disassembly of the wedge segments 16a can be achieved by driving the roll pins 29 from the accompanying roll pin seats 27 and removing the corresponding retainer bars 28 from the respective retainer pin slots 17. The respective wedge segments 16a are able to "articulate", or pivot inwardly and outwardly about the retainer bars 28 and the roll pins 29 in both the horizontal and vertical planes as the spring-loaded wedge 2 is viewed in FIGS. 10 and 11.

Figure 2:
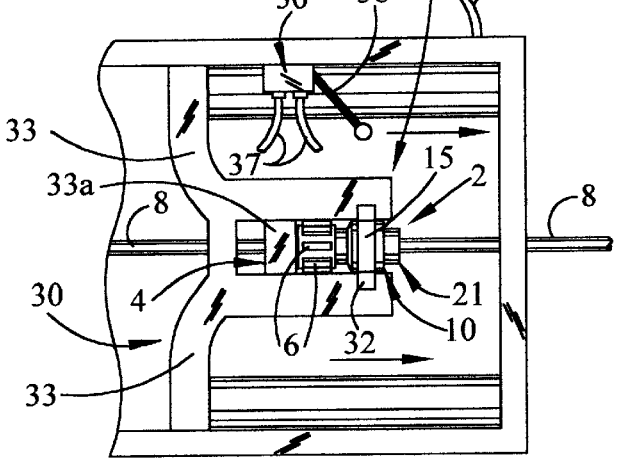
FIG. 2 is a top view, partially in section, of the spring-loaded wedge and rod driving apparatus illustrated in FIG. 1, with the driving apparatus pistons in retracted, pipe-driving configuration.

Referring again to FIGS. 10 and 11 and FIGS. 1 and 2 of the drawings, the pipe pulling and pushing apparatus 1 of this invention is operated as follows. When the spring-loaded wedge 2 is mounted in the carriage slot 32 of the carriage 31 of the driving apparatus 30 as illustrated in FIG. 1 and the rod or pipe 8 is deployed through the spring-loaded wedge 2 as illustrated, the rod or pipe 8 is ready to be pushed or pulled through the terrain 40 beneath a barrier such as a road 41, as illustrated in FIGS. 4 and 5. Assuming the terrain 40 and the road 41 to be on the right-hand side of the frame 39 of the driving apparatus 30 as illustrated in FIG. 4, pressure is applied to the mount plate flange 15a of the spring-loaded wedge 2 by movement of the carriage 31 through retraction of the cylinder pistons 35 into the respective hydraulic cylinders 34, as illustrated in FIG. 2. Before this action, the wedge segments 16a articulate or pivot inwardly on the retainer bars 28 and the wedge 16 is slidably extended toward the male coupling 21 in the tapered bore 11 of the adaptor body 10 by the tension in the coil spring 24, as illustrated in FIG. 11. This tension in the coil spring 24 is adjusted by threading the pipe coupling 4 on the upper end of the adaptor body 10 such that the wedge teeth 18a of the wedge 16 engage the rod or pipe 8 and remain so engaged upon motion of the carriage 31 and the driving apparatus 30 in the direction of the arrows in FIG. 2. Accordingly, engagement of the wedge teeth 40a with the rod or pipe 8 is effected by articulation of the wedge segments 16a inwardly about the retainer bars 28 as forward motion of the spring-loaded wedge 2 begans in the direction of the arrow illustrated in FIGS. 2 and 11 by operation of the driving apparatus 30. This action forces the rod or pipe 8 into the terrain 40 and compresses the coil spring 24 against the wedge 16. Further manipulation of the control lever 38 to reverse movement of the carriage 31 and the spring-loaded wedge 2 extends the cylinder pistons 35 from the hydraulic cylinders 34 as illustrated in FIG. 1 and causes the wedge teeth 18a to articulate outwardly by application of spring tension and release from engagement with the rod or pipe 8 as the spring-loaded wedge 2 moves with the carriage 31 in the opposite direction, as illustrated in FIG. 10. The tension in the coil spring 24 forces the wedge 16 toward the male coupling 21, causing the wedge teeth 18a to again engage the rod or pipe 8 when the spring-loaded wedge 2 is in the position illustrated in FIG. 11, and the procedure is repeated, thus incrementally and sequentially forcing the rod or pipe 8 into the terrain 40 and under the road 41.

In an alternative preferred embodiment of the invention and referring to FIG. 5 of the drawings, the driving apparatus 30 can be set up in a trench or depression adjacent to terrain 40 through which a rod or pipe 8 has been previously pushed, for engaging the rod or pipe 8 and pulling it through the terrain 40, while at the same time forcing it through another segment of terrain 40 beneath a second barrier, such as another road 41 (not illustrated). Accordingly, under circumstances where it is desired to force the rod or pipe 8 through the terrain 40 beneath consecutive barriers such as a pair of roads 41 lying adjacent to each other, the pipe pulling and pushing apparatus 1 can be utilized as described above to initially force the rod or pipe 8 beneath the first segment of terrain 40 under the first road 41 such that the end of the rod or pipe 8 projects from the opposite side of the terrain 40 into a trench or depression which is dug for the purpose or naturally occurs, as the case may be. The pipe pulling and pushing apparatus 1 can then be moved into the trench or depression into which the rod or pipe 8 projects and the spring-loaded wedge 2 again installed on the rod or pipe 8 and positioned in the carriage 31 of the driving apparatus 30 as illustrated in FIGS. 1 and 2 to continue extension of the rod or pipe 8 through the opposite side of the trench or depression and into a second terrain 40 beneath the second road 41, and so on.

It will be appreciated by those skilled in the art that the pipe pulling and pushing apparatus and method of this invention is versatile and easy to use and can be applied to a rod or pipe 8 of substantially any desired size, although the rod or pipe 8 pulled or pushed through the ground according to this invention is typically about 1⅛ of an inch to about 4 inches in diameter but may be typically any drill stem diameter. Furthermore, while the rod or pipe 8 can be normally used to provide a pilot hole or opening through the terrain 40 beneath the barrier such as the road 41 for extension of a larger pipe through the pilot bore, it can also be used in pipe bursting operations. For example, under circumstances where there is an existing collapsed or damaged water or alternative fluid line and it is desired to extend a new line along the path of the old lines the pipe pulling and pushing apparatus 1 can be used as described above to force a mandrel tool known to those skilled in the art through the existing pipe to burst the pipe and facilitate the laying of a new pipe line in the path of the old line.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. Apparatus for pushing and pulling pipe underground comprising an adaptor; a first coupling adjustably attached to said adaptor; a wedge mechanism slidably disposed in said adaptor for releasably engaging the pipe when the pipe extends through said adaptor and said first coupling; a bias mechanism provided in said first coupling for selectively engaging said wedge mechanism and biasing said wedge mechanism against the pipe; and a pipe driving mechanism engaging said adaptor for intermittently applying pressure on said adaptor and selectively pulling or pushing the pipe underground responsive to incremental engagement and release of the pipe by said wedge mechanism.

2. The apparatus of claim 1 comprising a second coupling attached to said adaptor wherein the pipe extends through said second coupling.

3. The apparatus of claim 1 comprising internal coupling threads provided on said first coupling and external adaptor threads provided on said adaptor and wherein said internal coupling threads engage said external adaptor threads for removably securing said first coupling on said adaptor and selectively tensioning said bias mechanism against said wedge mechanism.

4. The apparatus of claim 3 comprising a second coupling attached to said adaptor wherein the pipe extends through said second coupling.

5. The apparatus of claim 4 comprising external coupling threads provided on said second coupling and internal adaptor threads provided on said adaptor and wherein said external coupling threads engage said internal adaptor threads for removably securing said second coupling on said adaptor.

6. The apparatus of claim 1 wherein said bias mechanism comprises a coil spring encircling the pipe.

7. The apparatus of claim 6 comprising a second coupling attached to said adaptor wherein the pipe extends through said second coupling.

8. The apparatus of claim 7 comprising external coupling threads provided on said second coupling and internal adaptor threads provided on said adaptor and wherein said external coupling threads engage said internal adaptor threads for removably securing said second coupling on said adaptor.

9. The apparatus of claim 8 comprising internal coupling threads provided on said first coupling and external adaptor threads provided on said adaptor and wherein said internal coupling threads engage said external adaptor threads for removably securing said first coupling on said adaptor and selectively tensioning said bias mechanism against said wedge mechanism.

10. The apparatus of claim 1 wherein said wedge mechanism comprises at least two wedge segments and at least one retainer bar pivotally engaging said wedge segments for selectively pivoting at least one of said wedge segments with respect to the other of said wedge segments on said retainer bar.

11. The apparatus of claim 10 comprising a second coupling attached to said adaptor wherein the pipe extends through said second coupling.

12. The apparatus of claim 11 comprising external coupling threads provided on said second coupling and internal adaptor threads provided on said adaptor and wherein said external coupling threads engage said internal adaptor threads for removably securing said second coupling on said adaptor.

13. The apparatus of claim 12 comprising internal coupling threads provided on said first coupling and external adaptor threads provided on said adaptor and wherein said internal coupling threads engage said external adaptor threads for removably securing said first coupling on said adaptor.

14. The apparatus of claim 13 wherein said pipe driving mechanism comprises a carriage adapted to engage said adaptor and a fluid-operated piston mechanism operably attached to said carriage for selectively shifting said spring-loaded wedge forwardly and rearwardly to push or pull the pipe underground and said bias mechanism comprises a coil spring encircling the pipe.

15. Apparatus for pushing or pulling a rod or pipe underground comprising a spring-loaded wedge characterized by an adaptor having a tapered bore; external adaptor threads provided in said adaptor at one end thereof and internal adaptor threads provided in said adaptor at the opposite end thereof; a wedge mechanism slidably disposed in said tapered bore for intermittently engaging the rod or pipe; a first coupling having internal coupling threads for engaging said external adaptor threads of said adaptor and removably securing said first coupling on said one end of said adaptor; a coil spring disposed in said first coupling, said coil spring selectively engaging and tensioning said wedge mechanism responsive to threadable tightening of said first coupling on said one end of said adaptor; a second coupling having external coupling threads for engaging said internal adaptor threads of said adaptor and removably securing said second coupling on said opposite end of said adaptor; and a pipe driving mechanism engaging said adaptor for intermittently applying pressure on said adaptor and selectively pulling or pushing the pipe underground responsive to intermittent engagement and release of the pipe by said wedge mechanism.

16. The apparatus of claim 15 wherein said wedge mechanism comprises at least three wedge segments and at least one retainer bar pivotally engaging at least two of said wedge segments for selectively pivoting at least one of said wedge segments with respect to the other of said wedge segments on said retainer bar.

17. The apparatus of claim 15 wherein said pipe driving mechanism comprises a carriage adapted to engage said adaptor and a fluid-operated piston mechanism operably attached to said carriage for selectively shifting said adaptor forwardly and rearwardly to intermittently engage and release said spring-loaded wedge on the pipe and push or pull the pipe underground.

18. The apparatus of claim 17 wherein said wedge mechanism comprises at least three wedge segments and at least one retainer bar pivotally engaging at least two of said wedge segments for selectively pivoting at least one of said wedge segments with respect to the others of said wedge segments on said retainer bar.

19. Apparatus for use with a pipe driving mechanism for pushing and pulling a rod or pipe underground, said apparatus comprising a spring-loaded wedge characterized by an adaptor for engaging the pipe driving mechanism, said adaptor having two ends and a tapered bore; an articulating wedge mechanism slidably disposed in said tapered bore; a first coupling removably engaging one end of said adaptor;

a coil spring disposed in said first coupling, said coil spring selectively engaging and tensioning said wedge mechanism responsive to tightening of said first coupling on said one of said two ends of said adaptor; and a second coupling engaging the other of said two ends of said adaptor, wherein the pipe driving mechanism selectively intermittently pushes or pulls said adaptor for pulling and pushing the rod or pipe underground responsive to intermittent engagement and release of the rod or pipe by said wedge mechanism.

20. The apparatus of claim 19 comprising internal coupling threads provided on said first coupling and external adaptor threads provided on said one of said two ends of said adaptor and wherein said internal coupling threads engage said external adaptor threads for removably securing said first coupling on said adaptor and selectively tensioning said coil spring against said wedge mechanism.

21. The apparatus of claim 19 comprising external coupling threads provided on said second coupling and internal adaptor threads provided on said other of said two ends of said adaptor and wherein said external coupling threads engage said internal adaptor threads for removably securing said second coupling on said adaptor.

22. The apparatus of claim 19 comprising:
   (a) internal coupling threads provided on said first coupling and external adaptor threads provided on said one of said two ends of said adaptor and wherein said internal coupling threads engage said external adaptor threads for removably securing said first coupling on said adaptor and selectively tensioning said coil spring against said wedge mechanism; and
   (b) external coupling threads provided on said second coupling and internal adaptor threads provided on said other of said two ends of said adaptor and wherein said external coupling threads engage said internal adaptor threads for removably securing said second coupling on said adaptor.

23. The apparatus of claim 19 wherein said wedge mechanism comprises at least two wedge segments and at least one retainer bar pivotally engaging said wedge segments for selectively pivoting at least one of said wedge segments with respect to the other of said at least one of said wedge segments on said retainer bar.

24. The apparatus of claim 23 comprising:
   (a) internal coupling threads provided on said first coupling and external adaptor threads provided on said one of said two ends of said adaptor and wherein said internal coupling threads engage said external adaptor threads for removably securing said first coupling on said adaptor and selectively tensioning said coil spring against said wedge segments; and
   (b) external coupling threads provided on said second coupling and internal adaptor threads provided on said other of said two ends of said adaptor and wherein said external coupling threads engage said internal adaptor threads for removably securing said second coupling on said adaptor.

25. A method for pushing or pulling pipe underground comprising providing a spring-loaded wedge characterized by an adaptor having two ends, a first coupling attached to one end of said adaptor, a second coupling attached to the other end of said adaptor and a tapered bore provided in said adaptor, at least two wedge segments slidably disposed in said tapered bore of said adaptor for engaging the pipe and a spring disposed in said first coupling for intermittently biasing said wedge segments against the pipe in said tapered bore of said adaptor; and providing a pipe driving apparatus for engaging said adaptor and intermittently applying pressure to said adaptor and forcing the pipe underground responsive to intermittent engagement of said wedge segments with the pipe.

* * * * *